United States Patent
Zboril et al.

(10) Patent No.: US 7,092,404 B1
(45) Date of Patent: Aug. 15, 2006

(54) INTERPOSER CHIP FOR PROTOCOL CONVERSION

(75) Inventors: Thomas George Zboril, Mississauga (CA); David Andrew Knox, Nepean (CA)

(73) Assignee: Tropic Networks Inc., Kanata (CA)

( * ) Notice: Subject to any disclaimer, the term of this patent is extended or adjusted under 35 U.S.C. 154(b) by 1036 days.

(21) Appl. No.: 10/128,290

(22) Filed: Apr. 24, 2002

Related U.S. Application Data

(60) Provisional application No. 60/286,670, filed on Apr. 27, 2001.

(51) Int. Cl.
*H04J 3/16* (2006.01)
*H04J 3/22* (2006.01)

(52) U.S. Cl. .................................................. 370/466
(58) Field of Classification Search ............... 370/465, 370/466, 389, 395.1, 229, 230, 231, 232, 370/233, 351, 352, 488, 413–419, 445, 444; 709/230
See application file for complete search history.

(56) References Cited

U.S. PATENT DOCUMENTS

| | | | |
|---|---|---|---|
| 6,965,922 B1* | 11/2005 | Holland et al. | 709/213 |
| 2002/0049841 A1* | 4/2002 | Johnson et al. | 709/225 |
| 2002/0159385 A1* | 10/2002 | Susnow et al. | 370/229 |

\* cited by examiner

*Primary Examiner*—Ajit Patel
(74) *Attorney, Agent, or Firm*—Victoria Donnelly

(57) ABSTRACT

An interposer chip providing translation of data between DASL and Unilink protocols and operating in one of the line card mode or switch card mode is provided. Additionally, it provides compatibility of Unilink ports with EQ switch fabric, sub-port flow control and capability of DASL ports to support individual ports and link parallel ports.

6 Claims, 3 Drawing Sheets

INTERPOSER CHIP FOR PROTOCOL CONVERSION

RELATED APPLICATION

This application claims the benefit of U.S. Provisional Application Ser. No. 60/286,670 filed on Apr. 27, 2001.

FIELD OF THE INVENTION

The invention relates to chip design, and in particular, to a chip design which provides translation between Unilink and Data Aligned Serial Link (DASL) protocols.

BACKGROUND OF THE INVENTION

DASL is an IBM protocol which is based on 500 MHz serial links that are bundled into 4 Gbps logical ports. DASL is used by the IBM Rainier network processor (NP) and the IBM PRIZMA-EP switch chip. Normally, the NP is connected directly to the switch via the DASL interface. However, to allow compatibility with future IBM products, there is a desire to use Unilink as a backplane interface.

Unilink protocol is based on Infiniband compliant 2.5 GHz serial links, using 8b/10b encoding and bundled into 16 Gbps logical ports (20 Gbps raw data rate with encoding). The EQ switch fabric uses Unilink as its interface. It allows the use of sub-ports, where backpressure information is gathered for four sub-ports in each logical port. This information is then broadcast to all other ports, allowing non-blocking backpressure to be applied to ports that are less than 16 G.

IBM provides a current solution which allows a Unilink backplane to connect to an EP switch fabric. This is known as the SCIC (Switch Core Interface Chip). The SCIC converts Unilink into DASL protocol on the switch card, and is designed to allow next generation line cards to communicate with the EP switch fabric. Next generation line cards will communicate with the switch through the C192 chip, which is a CSIX to Unilink converter. The C192 can communicate with both the SCIC and the EQ switch fabric, the EP switch chip is a currently used switch fabric which is a predecessor of EQ switch chip.

Unfortunately, there are several problems with the SCIC. First, it is not designed to interface to the NPs on the DASL side, as it only communicates with the EP switch fabric in a link parallel mode, where four 4 Gbps ports are logically connected to create a 16 Gbps port, thus making it impossible to connect four NPs to the DASL side. The second problem with the SCIC is that the data formats on the Unilink backplane are not compatible with data formats used by the EQ switch fabric. The C192 is designed to operate in two modes, the modes being SCIC or EQ. Third, the SCIC does not support the sub-port backpressure mechanism.

Currently, the only way to transfer information from the Rainier NPs to a Unilink backplane is to use an external programmable device (or several of them). This means that the FPGA chips must also have two modes, namely SCIC or EQ modes. In SCIC mode, there is no sub-port backpressure mechanism, so the four NPs connected through the FPGA to the SCIC must share a single port with only one backpressure mechanism. This means that each NP can block other processors. Additionally, it means that several different types of chips have to be used to achieve the required translation of signals between the two protocols. It makes electronic design extremely complicated and expensive.

Accordingly, there is a need in industry for development of an alternative solution, an interposer chip, which would avoid the above-mentioned problems.

SUMMARY OF THE INVENTION

There is an object of the invention to provide an interposer chip which would provide translation between DASL and Unilink protocols while supporting sub-port flow control.

According to an aspect of the invention there is provided an interposer chip, comprising:
  an interposer chip, having a first side and a second side, the first side having Unilink ports and the second side having DASL ports, the chip comprising:
  means for translating data from DASL protocol received at DASL ports into Unilink protocol at Unilink ports, and translating data from Unilink protocol received at Unilink ports to DASL protocol at DASL ports, the data received in DASL and Unilink protocols comprising a plurality of data cells in corresponding protocols.

Beneficially, the interposer chip further comprises means for providing compatibility of Unilink ports with PRIZMA-EQ switch fabric means for sub-port flow control. Advantageously, it also provides a capability for DASL ports to support individual ports and link parallel ports. Beneficially, the means for translating comprises means providing operation of the chip in one of a line card mode and means providing operation of the chip in a switch card mode. Conveniently, the means providing operation in the line card mode comprises a first block, providing data translation from DASL protocol Unilink protocol, including:
  cell parsing module for arranging cells received at DASL ports in queues;
  first cell translation unit for modifying cell headers received from the cell parsing module so as to accommodate Unilink protocol;
  ingress buffer manager for managing the modified cells received from the first cell translation module;
  ingress buffer for providing storage of the cells received from the ingress buffer manager; and
  ingress scheduler for transmitting the cells received from the ingress buffer.

The means for providing operation in the line card mode further comprises a second block, providing data translation from Unilink protocol into DASL protocol, including:
  second cell translation module for modifying cell headers received at Unilink ports so as to accommodate DASL protocol;
  egress buffer manager for managing the modified cells received from the second translation unit;
  egress buffer for providing storage of the cells received from the egress buffer manager; and
  egress scheduler for transmitting the cells received from the egress buffer.

The means supporting operation in the switch card mode comprises:
  a third block providing data translation from Unilink protocol to DASL protocol, the block including a third cell translation module for modifying cell headers received at Unilink ports so as to accommodate DASL protocol; and
  a fourth block providing data translation from DASL protocol to Unilink protocol, the block including a fourth cell translation module for modifying cell headers received at DASL ports so as to accommodate Unilink protocol.

According to another aspect of the invention there is provided a method of translating data, having a plurality of data cells, between DASL and Unilink protocols, comprising the steps of:

translating data in a line card mode; and translating data in a switch card mode.

Beneficially the step of translating data in the line card mode comprises translating data from DASL protocol into Unilink protocol, including the steps of:

arranging data cells received in DASL protocol into queues according to destination and priority;

modifying data cell headers so as to accommodate Unilink protocol;

managing the modified data cell flow, including storage of data cells; and transmitting the managed data cell flow.

Advantageously, the step of translating data in the line card mode comprises translating data from Unilink protocol into DASL protocol, including the steps of:

modifying data cell headers received in Unilink protocol so as to accommodate DASL protocol;

managing the modified data cell flow including storage of data cells; and transmitting the managed data cell flow.

The step of translating data in the switch card mode comprises modifying data cell headers so as to accommodate the required protocol.

BRIEF DESCRIPTION OF DRAWINGS

Embodiment of the invention will now be described, by way of example, with reference to the accompanying drawings in which.

DETAILED DESCRIPTION OF PREFERRED EMBODIMENT

Figure 1:
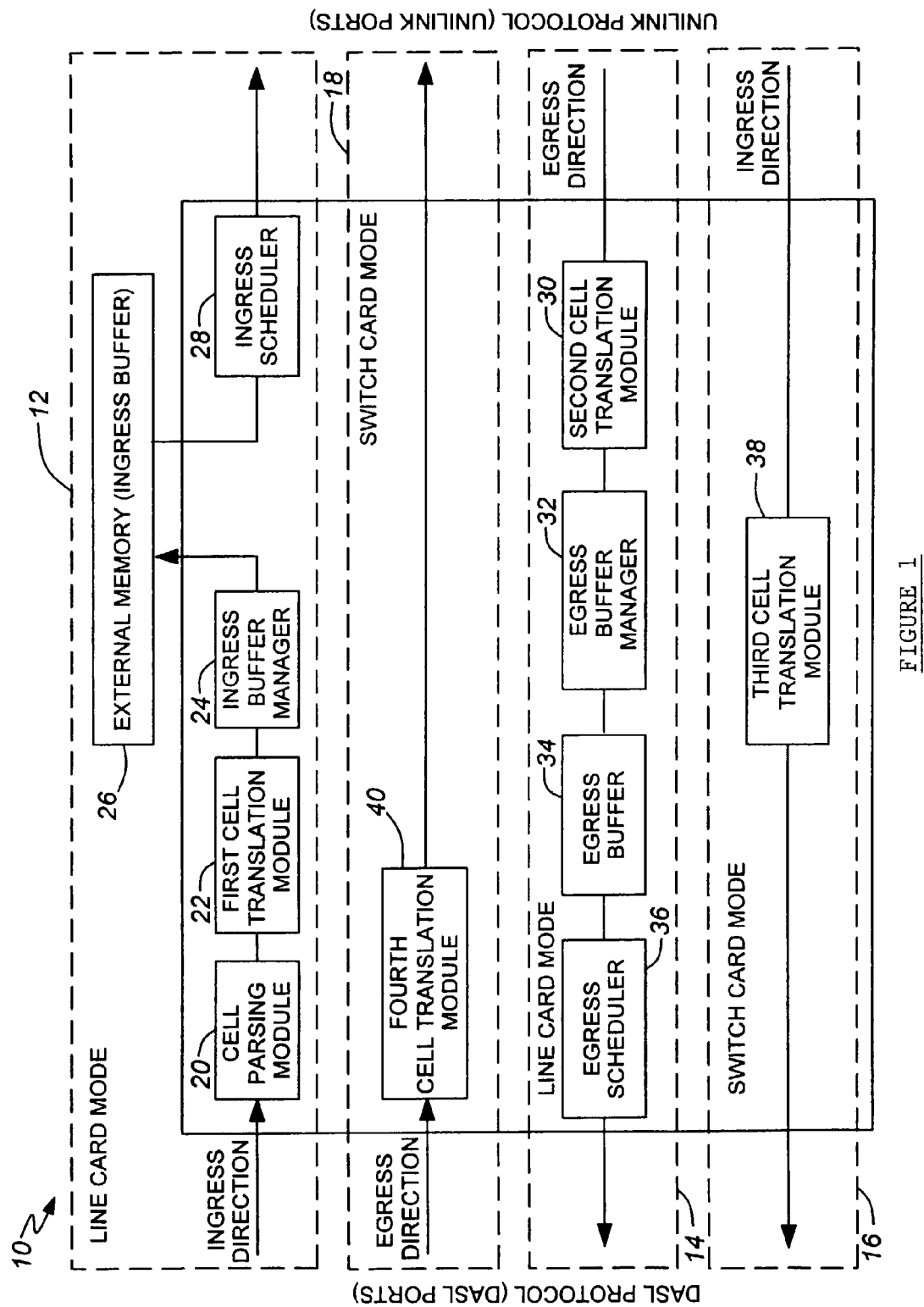
FIG. 1 is a block diagram of an interposer chip according to an embodiment of the invention.

A block diagram 10 illustrating design of the interposer chip of an embodiment of the invention is shown in FIG. 1.

The interposer chip ASIC is intended to be used anywhere that IBM's DASL protocol has to interface with IBM's Unilink protocol, and more specificially, the Unilink protocol being that which is compatible with the IBM PRIZMA-EQ switch. The chip 10 provides an interface between an NP and a switching fabric (PRIZMA EP) and operates in one of two modes: line card mode or switch card mode. The common interface is EQ compatible Unilink.

The chip 10 comprises first and second blocks 12 and 14 which provide operation of the chip in line card mode, and third and fourth blocks 16 and 18 which provide operation of the chip in switch card mode.

Block 12 provides data flow in ingress direction, the ingress direction being the direction of data flow from the NPs into the switching fabric (i.e., from DASL to Unilink ports), and includes the following modules: cell parsing module 20, first cell translation module 22, ingress buffer manager 24, ingress buffer 26, and an ingress scheduler 28. Cell parsing module 20 puts cells of information received in DASL format into queues based on their destination and priority. First cell translation module 22 modifies cell headers to accommodate Unilink protocol. Prioritized and modified cells are received by Ingress buffer manager 24 which manages storage of cells, and if required, uses external memory (the ingress buffer 26) to supplement the network processor buffering capability. Scheduler 28 further transmits the received data according to its destination and priority, preferably with an option to guarantee minimum bandwidth to portions of data which have lower priorities.

Block 14 provides data flow in egress direction, the egress direction being the direction of data flow from the switching fabric into the NPs (i.e., from Unilink to DASL ports), and includes the following modules: second cell translation module 30, egress buffer manager 32, egress buffer 34 and egress scheduler 36. Second cell translation module 30 modifies cell headers to accommodate DASL protocol followed by prioritization and storage of cells in egress buffer manager 32 using egress buffer 34 (internal memory). Egress scheduler 36 finishes processing of data in egress direction by transmitting data cells in accordance with their destination and priority.

In switch card mode, blocks 16 and 18 including third and fourth cell translation modules 38 and 40 respectively, provide corresponding modifications to cell headers to accommodate the two protocols.

Description of the design and operation of the interposer chip 10 is provided in greater detail below.

Figure 2:
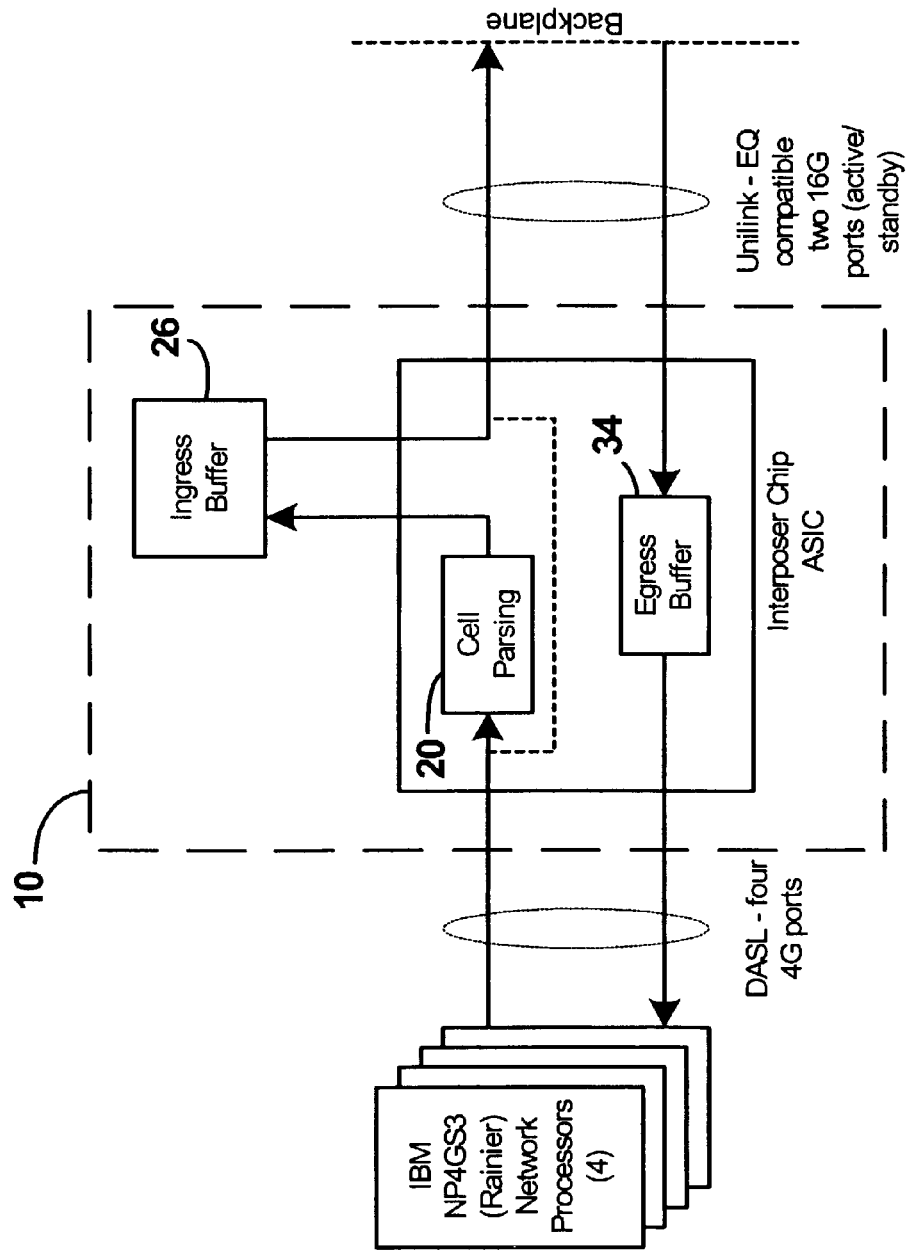
FIG. 2 is a block diagram illustrating operation of the interposer chip of FIG. 1 in line card mode.
Figure 3:
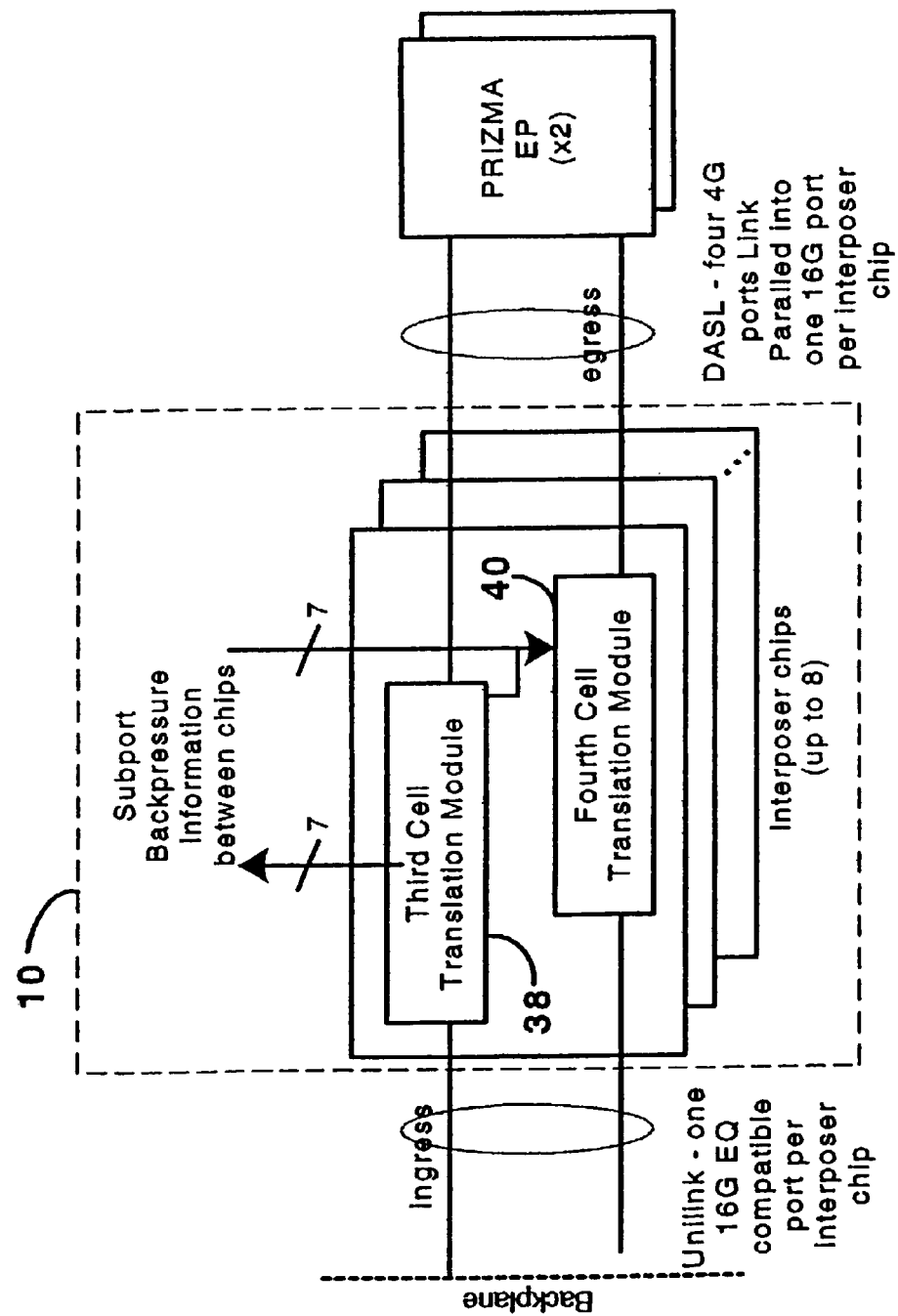
FIG. 3 is a block diagram illustrating operation of the interposer chip in switch card mode.

In line card mode, the Unilink interface can communicate with another interposer chip in switch card mode, or an EQ switch fabric. In switch card mode, the Unilink interface can communicate with a C192 chip in EQ mode or with another interposer chip in line card mode. FIG. 2 shows the interposer chip in line card mode and FIG. 3 shows the interposer chip in switch card mode, wherein corresponding portions of more detailed chip design of FIG. 1 are shown. In both line card mode and switch card mode, the interposer chip supports generation of idle cells and any required handling of coloured cells.

In line card mode, there is provision for external buffering of cells to supplement the network processor's limited ingress buffering capability. The buffering can be bypassed to minimize board space and cost. The buffering is controlled by a cell parser that puts the cells into queues based on destination and priority.

In the egress direction, there is an internal buffer that allows queuing for each sub-port so that the sub-ports can be backpressured individually without causing the entire port to be backpressured.

In both ingress and egress directions, cell headers are modified to accommodate the different protocols.

In switch card mode, the interposer chip just modifies the cell headers in both ingress and egress directions to accommodate the different protocols. The headers on the Unilink side contain sub-port backpressure information. This information is shared between all the ports of the switch. The Unilink ports that are used for the standby connection in line card mode are used to create a fully interconnected mesh of interposer chips in the switch card mode. This mesh is used to communicate the sub-port backpressure information between interposer chips.

Line Card Mode

In the line card mode, the interposer chip serves three basic purposes:

Conversion of cell formats between DASL and Unilink (EQ compatible).

Supplementing ingress buffering of Rainier network processor.

Egress buffering to support sub-port flow control.

Cell Format Conversion

The cell formats are different between the DASL links that connect to the network processors (NPs) and the Unilink ports that connect to the switch fabric(s). The switch cell header portion of the cell headers that come from the NP consists of three bytes. In the ingress direction, they are: a qualifier byte (H0), and two bytes of "target blade" (H1, H2), which is essentially a multicast ID. In the egress direction, the target blade field is replaced with output queue grant information. This assumes the NP is in 64-blade mode.

The cell headers for the EQ compatible Unilink vary depending on whether sub-port addressing is used. If sub-port addressing is used, there are four bytes of cell header: a qualifier byte (H0), a target blade (H1), and two bytes of "routing index" (RI1 and RI2). As with the DASL interface, the target blade field is replaced with output queue grant (and sub-port flow control) information on egress.

The "target blade" field from the NP is used to derive the H1 byte (and the extended bitmap (EBM) bit of the H0 byte, all via lookup) of the EQ cell header and is copied directly into the routing index field.

While converting between DASL and Unilink it is necessary to take into account that Unilink has one more overhead byte, if the routing index is used.

For the interposer chip which is used exclusively on line cards (i.e. no line card uses C192), it is possible to reduce the routing index to 11-bits and not have to increase the cell size. This can be done by using the H2 byte of the cell plus the unused bits in the NP cell header to hold the 11-bit routing index. It excludes the C192 from being used on line cards.

Increasing the cell size (by padding the cells with unused bytes) reduces the throughput of the switch. In order to add the one byte of cell header, 8 bytes must be added to the cell size, as the EQ only supports 64, 72 or 80 byte cells. This represents 12.5% more overhead.

In this case, an FPGA has to be put between the C192 and any NPs to remove the extra bytes from the cells.

To do the required cell manipulation, packets will need to be disassembled and repacked into different sized cells (or the same sized cell, with a different number of data bytes). Alternatively, it is possible to increase the cell size. Either way, latency is increased, as in both direction (either ingress or egress), data may have to be held until the next cell arrives, since the incoming cell doesn't have enough data to fill the outgoing cell size.

The holding of data requires a buffer of 3072 cells on egress (which is the maximum number of simultaneous packets that a Rainier NP can handle), and 192 cells on ingress (the maximum number of simultaneous packets that four Rainier NPs can generate in 64 blade mode). The cell size that is buffered is the size of the outgoing cell minus the cell header size. For example, if the Unilink interface is configured for 72 byte cells (with 4 bytes switch cell overhead and 3 bytes NP cell overhead), the storage on ingress would need to be 48*(72−7)=3264 bytes and the storage on egress would need to be 3072*(64−6)=178,176 bytes (64 byte cells, 3 bytes switch cell overhead and 3 bytes NP cell overhead). The cell overhead is stored once for each packet and copied into each outgoing cell of the packet, with appropriate modifications to the "cell state" and "EndPtr" fields.

Ingress Buffering

In order to supplement the limited ingress buffering capability of the Rainier NP, an external memory interface is provided in the interposer chip ASIC. Cells are parsed by interposer chip and queued accordingly. The queues are organized as virtual output queues, where the outputs are considered as up to sixteen 16G ports with up to four sub-ports each. Four priorities are supported, which represents 256 queues.

A scheduling algorithm provides transmission of data cells in accordance with their destination and priority.

Flow control is provided either in band or out of band to the Rainer NPs, based on queue fill levels. The Rainier NP supports only a limited number of backpressure priorities, so there is a flexible mapping of the four priorities of queues into the two priorities supported by the NP.

Cell parsing can be implemented in several ways. The easiest way is to examine the switch cell header alone (3 bytes) and put cells in the queues based on a simple lookup of the target blade field and the priority bits of the H0 byte. Multicast cells are queued into the queue of one of the destination outputs. The multicast lookup table (target blade/routing index fields) are set up such that the output that multicast cells (with different target blade fields) are queued for is randomly distributed, so that one output queue does not receive an unfair share of multicast cells.

A more advanced method of parsing would involve queuing cells based on a field in the packet header (frame header in NP speak). To do this, the cells belonging to a packet need to be tracked. If the cell size is being changed as described previously, this may already be done. With this method, a bit-field of up to 20-bits in length (ex. MPLS tag) can be extracted from the packet and used to look up which queue to put the cells in. With this method, all four switch priorities can be used, even though the NP only supports less than four.

Finally, the entire packet header can be provided to a programmable processing element that can then implement various algorithms for queuing, e.g., RED or WRED. The requirements for the processing must be carefully defined, as the total ingress bandwidth is 16 Gbps, and there is only a limited amount of processing that can be done at this rate.

The memory interface is TBD, e.g., FCRAM or RAMBUS, depending on performance, price, and availability on the market. The size of the memory is chosen to be enough to store approximately 100 ms of ingress traffic. This works out to be about 256 Mbytes, with an aggregate bandwidth (read and write) of 32 Gbps.

Egress Buffering

Egress buffering is provided on-chip to allow time for sub-port backpressure to traverse the switch fabric and to absorb cells destined for a backpressured sub-port during the time it takes for the sub-port backpressure mechanism to take effect. The number of cells that can arrive at the sub-port from the time the backpressure is initiated is referred to as "feedback volume". The sizing of the buffer should be sufficient to store the feedback volume for all four sub-ports. Statistics can be used to reduce the size of the buffer with certain probability of blocking.

If the cell size is changed at egress as described previously, the egress buffer already needs to be quite large, so the additional requirements of absorbing the feedback volume are not excessive.

Switch Card Mode

Switch card mode assumes the PRIZMA-EP switch fabric is configured as eight 16 Gbps ports. In this mode, only the H0 and H1 bytes of the switch cell header are required. There is a simple translation of Unilink/EQ H0 byte to EP H0 byte, and the H1 field is copied directly. The extended bitmap (EBM) field in the EQ H0 byte is required to be "0", otherwise the cell is discarded and an alarm is raised. In other words, eight ports are supported. A similar translation is performed in the egress direction. The routing index is ignored (treated as payload). There is no requirement to change the cell size.

In order to emulate the sub-port flow control mechanism of the PRIZMA-EQ switch fabric, the interposer chip ASIC extracts the flow control information from ingress cells and broadcasts it to all of the other interposer chips. The information from all of the other interposer chips is accumulated and sent to the line cards via egress packets.

The sub-port flow control information is communicated between interposer chips via the second Unilink port that in line card mode is used to connect to the redundant switch fabric. Each 2.5 Gbps transmitter carries identical information to the other seven interposer chips (leaving one transmitter unused). Each 2.5 Gbps receiver receives flow control information from the other seven interposer chips (leaving one receiver unused). The rate of the link is sufficiently fast that the information is sent identically several times during one LU cycle (the time it takes to transmit two cells over Unilink). A synchronization pulse is provided by one of the interposer chips to synchronize the distribution of the flow control information such that all interposer chips have the same information at the same time.

Multicast grant information for the switching fabric can not be provided, as it is impossible to perform the calculations necessary to create these signals. As it is, there is no support for multicast backpressure in the Rainier NP. Thus, the multicast grants are always asserted (i.e. multicast traffic is always allowed, subject to individual port backpressure).

Cells transmitted via the DASL interface are appropriately staggered to comply with the requirements of the link paralleling mode of the PRIZMA-EP switch.

Although specific embodiments of the invention have been described in detail, it will be apparent to one skilled in the art that variations and modifications to the embodiments may be made within the scope of the following claims.

What is claimed is:

1. An interposer chip, having a first side and a second side, the first side having Unilink ports and the second side having DASL ports, the chip comprising:
    means for translating data divided into a plurality of data cells from DASL protocol received at DASL ports into Unilink protocol at Unilink ports, and translating data from Unilink protocol received at Unilink ports to DASL protocol at DASL ports, data received in DASL and Unilink protocols being a plurality of data cells in corresponding protocols;
    means providing compatibility of Unilink ports with PRIZMA-EQ switch fabric;
    means for sub-port flow control;
    means providing a capability for DASL ports to support individual ports and link parallel ports;
    wherein the means for translating comprises means for providing operation of the chip in one of a line card mode and switch card mode; and
    wherein the means for providing operation in the line card mode comprises a first block providing data translation from DASL protocol to Unilink protocol, including:
        cell parsing module for arranging cells received at DASL ports in queues;
        first cell translation unit for modifying cell headers received from the cell parsing module so as to accommodate Unilink protocol;
        ingress buffer manager for managing the modified cells received from the first cell translation module;
        ingress buffer for providing storage of the cells received from the ingress buffer manager; and
        ingress scheduler for transmitting the cells received from the ingress buffer.

2. An interposer chip as described in claim 1, wherein the means for providing operation in the line card mode comprises a second block, providing data translation from Unilink protocol into DASL protocol, including:
    second cell translation module for modifying cell headers received at Unilink ports so as to accommodate DASL protocol;
    egress buffer manager for managing the modified cells received from the second translation unit;
    egress buffer for providing storage of the cells received from the egress buffer manager; and
    egress scheduler for transmitting the cells received from the egress buffer.

3. An interposer chip as described in claim 1, wherein the means supporting operation in the switch card mode comprises:
    a third block providing data translation from Unilink protocol to DASL protocol, the block including a third cell translation module for modifying cell headers received at Unilink ports so as to accommodate DASL protocol; and
    a fourth block providing data translation from DASL protocol to Unilink protocol, the block including a fourth cell translation module for modifying cell headers received at DASL ports so as to accommodate Unilink protocol.

4. A method of translating data, having a plurality of data cells, between DASL and Unilink protocols, comprising the steps of:
    translating data in a line card mode; and
    translating data in a switch card mode, wherein the step of translating data in the line card mode comprises translating data from DASL protocol into Unilink protocol, including the steps of:
    arranging data cells received in DASL protocol into queues according to destination and priority;
    modifying data cell headers so as to accommodate Unilink protocol;
    managing the modified data cell flow, including storage of data cells; and
    transmitting the managed data cell flow.

5. A method as described in claim 4, wherein the step of translating data in the line card mode comprises translating data from Unilink protocol into DASL protocol, including the steps of:
    modifying data cell headers received in Unilink protocol so as to accommodate DASL protocol;
    managing the modified data cell flow including storage of data cells; and
    transmitting the managed data cell flow.

6. A method as described in claim 4, wherein the step of translating data in the switch card mode comprises modifying data cell headers so as to accommodate the required protocol.

* * * * *